United States Patent

Morishima

(10) Patent No.: US 10,712,624 B2
(45) Date of Patent: Jul. 14, 2020

(54) METHOD FOR PRODUCING ACTIVE MATRIX SUBSTRATE AND ACTIVE MATRIX SUBSTRATE

(71) Applicant: SHARP KABUSHIKI KAISHA, Sakai, Osaka (JP)

(72) Inventor: Akifumi Morishima, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/504,155

(22) Filed: Jul. 5, 2019

(65) Prior Publication Data

US 2020/0033681 A1    Jan. 30, 2020

Related U.S. Application Data

(60) Provisional application No. 62/702,895, filed on Jul. 24, 2018.

(51) Int. Cl.
*G02F 1/1368* (2006.01)
*G02F 1/1362* (2006.01)

(52) U.S. Cl.
CPC ...... *G02F 1/136227* (2013.01); *G02F 1/1368* (2013.01); *G02F 1/136259* (2013.01)

(58) Field of Classification Search
CPC .............................................. G02F 1/136227
See application file for complete search history.

(56) References Cited

U.S. PATENT DOCUMENTS

| 2005/0162893 A1* | 7/2005 | Yagi | G02F 1/136259 365/149 |
| 2008/0024690 A1* | 1/2008 | Hirakata | G02F 1/136259 349/54 |
| 2008/0225196 A1* | 9/2008 | Kim | G02F 1/136259 349/54 |
| 2011/0294244 A1* | 12/2011 | Hattori | H01L 27/1218 438/34 |
| 2012/0307172 A1* | 12/2012 | Yoshida | G02F 1/133707 349/43 |

(Continued)

FOREIGN PATENT DOCUMENTS

| JP | 2000-171826 A | 6/2000 |
| JP | 2007-052128 A | 3/2007 |
| JP | 2010-145667 A | 7/2010 |

*Primary Examiner* — Sang V Nguyen
(74) *Attorney, Agent, or Firm* — ScienBiziP, P.C.

(57) ABSTRACT

A method for producing an active matrix substrate includes the steps of: (A) forming in individual pixels a thin-film transistor element, a first insulating film, a pixel electrode to be connected to a drain electrode of the thin-film transistor element through a contact hole formed at least in the first insulating film, a second insulating film, and a common electrode to be superposed on the pixel electrode outside the contact hole, with the second insulating film in between; (B) detecting a short-circuited pixel among the pixels; (C) removing the pixel electrode inside the contact hole in the short-circuited pixel and thereby isolating the pixel electrode from the drain electrode; and (D) forming a through hole that penetrates the second insulating film outside the contact hole in the short-circuited pixel, and connecting the pixel electrode and the common electrode to each other through the through hole.

4 Claims, 7 Drawing Sheets

(56) References Cited

U.S. PATENT DOCUMENTS

| | | | | |
|---|---|---|---|---|
| 2014/0353666 A1* | 12/2014 | Lee | ...................... | H01L 27/124 |
| | | | | 257/59 |
| 2018/0026057 A1* | 1/2018 | Zhang | ................. | H01L 27/1288 |
| | | | | 257/72 |
| 2018/0247959 A1* | 8/2018 | Chen | ................... | H01L 27/1244 |
| 2019/0317375 A1* | 10/2019 | Morinaga | ......... | G02F 1/133345 |

* cited by examiner

METHOD FOR PRODUCING ACTIVE MATRIX SUBSTRATE AND ACTIVE MATRIX SUBSTRATE

CROSS-REFERENCE TO RELATED APPLICATIONS

The present application claims priority under 35 U.S.C. § 119 to U.S. Provisional Patent Application No. 62/702,895 filed on Jul. 24, 2018, the contents of which are incorporated herein by reference in their entirety.

BACKGROUND OF THE INVENTION

Field of the Invention

The present invention relates to methods for producing an active matrix substrate and active matrix substrates.

Description of Related Art

Active matrix substrates including thin-film transistor elements are widely used as parts of a display device such as a liquid crystal display device or an organic electroluminescent display device (e.g., JP 2010-145667 A, JP 2007-52128 A, JP 2000-171826 A). Thin-film transistor elements function as switching elements. Each thin-film transistor element supplies a video signal, supplied to its source electrode, to the corresponding pixel electrode sequentially through its semiconductor layer and drain electrode, when a scanning signal is supplied to its gate electrode.

BRIEF SUMMARY OF THE INVENTION

In such an active matrix substrate, during its production, defects such as a short circuit between a source electrode and a drain electrode or a short circuit between a gate electrode and a drain electrode may occur. This may lead to a short-circuited pixel (defective pixel) whose thin-film transistor element fails to appropriately supply a video signal (apply voltage) to the pixel electrode. For example, an active matrix substrate for fringe field switching (FFS) mode liquid crystal display devices has a complicated structure including many parts such as thin-film transistor elements, pixel electrodes, and common electrode(s), and is therefore likely to cause a short-circuited pixel. Such a short-circuited pixel is perceived as a bright-spot pixel with a higher luminance than a normal pixel in the black display state in a liquid crystal display device in a normally black mode such as the FFS mode one. This significantly deteriorates the display quality.

One way to correct such a bright-spot pixel (short-circuited pixel) is, for example, to repair the pixel by turning the bright-spot pixel into a less noticeable black-spot pixel. The repair typically includes, for example, irradiating the drain electrode of the thin-film transistor element with a laser beam so as to partially remove the drain electrode and thereby isolate the drain electrode from the pixel electrode, i.e., stop supply of video signals to the pixel electrode. The repair also includes routing the common line connected to the common electrode into the pixel and connecting the common line to the drain electrode to stabilize the electric potential of the pixel electrode and thereby turn the bright-spot pixel into a black-spot pixel without fail.

The conventional repair, however, has raised the following issues (a) and (b) as high-definition display devices have been desired. For example, the inventions disclosed in JP 2010-145667 A, JP 2007-52128 A, and JP 2000-171826 A can also be improved in the same respects.

(a) A common line for repair is difficult to route into the pixel, so that the repair is difficult to perform.

(b) Even when a common line for repair is routed into the pixel, the aperture ratio of the pixel decreases, so that the display quality of the display device deteriorates.

In response to the above issues, an object of the present invention is to provide a method for producing an active matrix substrate, which enables repair without decreasing the aperture ratio of a pixel; and an active matrix substrate produced by the method.

(1) One embodiment of the present invention is directed to a method for producing an active matrix substrate, including the steps of: (A) forming in individual pixels a thin-film transistor element, a first insulating film, a pixel electrode to be connected to a drain electrode of the thin-film transistor element through a contact hole formed at least in the first insulating film, a second insulating film, and a common electrode to be superposed on the pixel electrode outside the contact hole, with the second insulating film in between; (B) detecting a short-circuited pixel among the pixels; (C) removing the pixel electrode inside the contact hole in the short-circuited pixel and thereby isolating the pixel electrode from the drain electrode; and (D) forming a through hole that penetrates the second insulating film outside the contact hole in the short-circuited pixel, and connecting the pixel electrode and the common electrode to each other through the through hole.

(2) In an embodiment of the present invention according to the item (1), the step (C) includes removing the pixel electrode by laser beam irradiation.

(3) In an embodiment of the present invention according to the item (2), the laser beam for irradiation in the step (C) has a wavelength equal to or shorter than ultraviolet light.

(4) In an embodiment of the present invention according to any one of the items (1) to (3), the step (D) includes melt-connecting the pixel electrode and the common electrode while forming the through hole by laser beam irradiation.

(5) In an embodiment of the present invention according to any one of the items (1) to (3), the step (D) includes forming the through hole by laser beam irradiation, depositing a metal material inside the through hole to form a metal layer, and connecting the pixel electrode and the common electrode to each other through the metal layer.

(6) In an embodiment of the present invention according to any one of the items (1) to (5), the active matrix substrate is an active matrix substrate for FFS mode liquid crystal display devices.

(7) Another embodiment of the present invention is directed to an active matrix substrate including a first pixel and a second pixel, the active matrix substrate including, in each of the first and second pixels: a thin-film transistor element; a first insulating film; a pixel electrode; a second insulating film; and a common electrode, in the first pixel, the pixel electrode and a drain electrode of the thin-film transistor element connected to each other through a first contact hole formed at least in the first insulating film, and the pixel electrode and the common electrode superposed on each other outside the first contact hole, with the second insulating film in between, in the second pixel, the pixel electrode and a drain electrode of the thin-film transistor element separated from each other inside a second contact hole formed at least in the first insulating film, and the pixel electrode and the common electrode connected to each other outside the second contact hole through a through hole formed in the second insulating film.

The present invention can provide a method for producing an active matrix substrate, which enables repair without decreasing the aperture ratio of a pixel, and an active matrix substrate produced by the method.

DETAILED DESCRIPTION OF THE INVENTION

The present invention is described in more detail based on the following embodiments with reference to the drawings. The embodiments, however, are not intended to limit the scope of the present invention. The configurations of the embodiments may appropriately be combined or modified within the spirit of the present invention.

The expression "X to Y" as used herein means "X or more and Y or less".

Embodiment 1

A method for producing an active matrix substrate according to Embodiment 1 and an active matrix substrate produced by the method are described below. In Embodiment 1, an example of producing an active matrix substrate for an FFS mode liquid crystal display device is described.

<Formation of Parts of Active Matrix Substrate>

Figure 1:
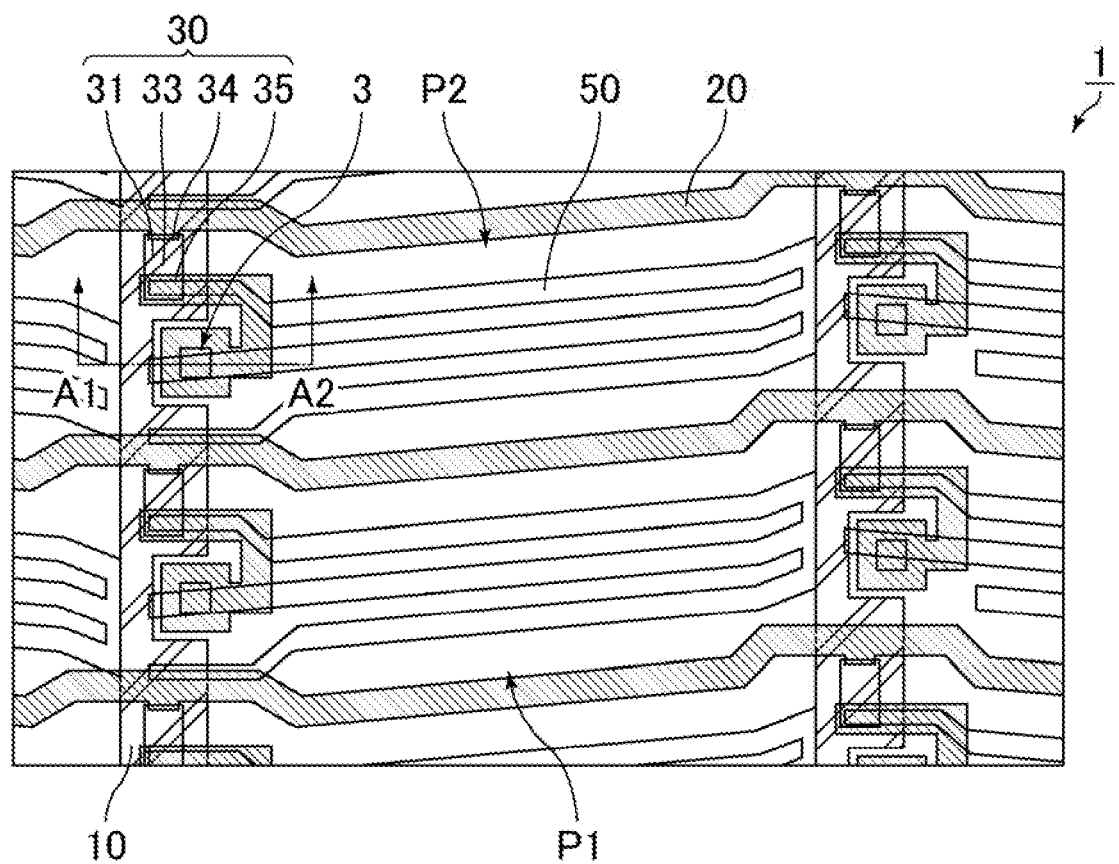
FIG. 1 is a schematic plan view showing a state after formation of parts in production of an active matrix substrate of Embodiment 1.
Figure 2:
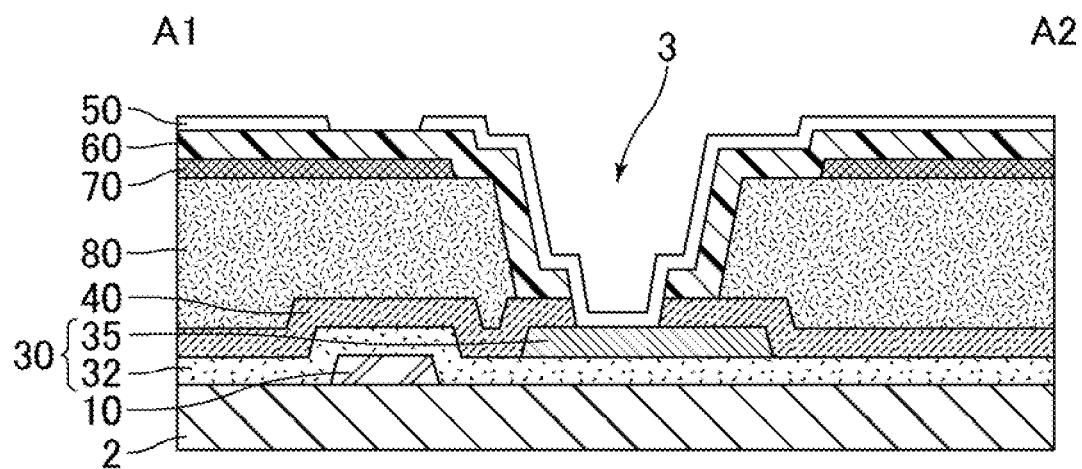
FIG. 2 is a schematic cross-sectional view of a portion taken along the line A1-A2 in FIG. 1.

FIG. 1 is a schematic plan view showing a state after formation of parts in production of the active matrix substrate of Embodiment 1. FIG. 2 is a schematic cross-sectional view of a portion taken along the line A1-A2 in FIG. 1. As shown in FIGS. 1 and 2, stacks of gate lines 10, source lines 20, thin-film transistor elements 30, first insulating film(s) 40, pixel electrodes 50, second insulating film(s) 60, common electrode(s) 70, and third insulating film(s) 80 are formed on a supporting substrate 2. These parts can be formed by known methods.

The gate lines 10 and the source lines 20 intersect with each other. Pixels defined by these lines are arranged in a matrix pattern. A thin-film transistor element 30, a first insulating film 40, a pixel electrode 50, a second insulating film 60, a common electrode 70, and a third insulating film 80 are formed in individual pixels. The first insulating film 40, the second insulating film 60, the common electrode 70, and the third insulating film 80 may each be a common component (an integrated component) in the pixels. FIG. 1 is a view with a focus on a first pixel P1 and a second pixel P2 among the pixels. Although FIG. 2 shows a cross section with a focus on the second pixel P2, a similar cross-sectional structure is formed in the first pixel P1.

The thin-film transistor element 30 includes a gate electrode 31, a gate insulating film 32, a semiconductor layer 33, a source electrode 34, and a drain electrode 35. The gate electrode 31 is connected to the corresponding gate line 10 on the surface of the supporting substrate 2. To the gate electrode 31 is thereby supplied a scanning signal through the gate line 10. The gate insulating film 32 covers the gate line 10 (gate electrode 31). The semiconductor layer 33 is formed on the surface remote from the supporting substrate 2 of the gate insulating film 32. The source electrode 34 is connected to the semiconductor layer 33 by covering one end of the semiconductor layer 33 and is also connected to the corresponding source line 20. To the source electrode 34 is thereby supplied a video signal through the source line 20. The drain electrode 35 is connected to the semiconductor layer 33 by covering the other end of the semiconductor layer 33.

The first insulating film 40 covers the thin-film transistor element 30. The third insulating film 80 is formed on the surface remote from the thin-film transistor element 30 of the first insulating film 40. The common electrode 70 is formed on the surface remote from the first insulating film 40 of the third insulating film 80. The second insulating film 60 covers the common electrode 70 and the third insulating film 80. A contact hole 3 is formed in the first insulating film 40 and the second insulating film 60. The pixel electrode 50 is connected to the drain electrode 35 through the contact hole 3. The pixel electrode 50 and the common electrode 70 are superposed on each other outside the contact hole 3, with the second insulating film 60 in between. To the pixel electrode 50 is supplied a video signal sequentially through the source electrode 34, the semiconductor layer 33, and the drain electrode 35, when a scanning signal is supplied to the gate electrode 31. To the common electrode 70 is supplied a reference signal that is common to the pixels and to be a reference of video signals.

The supporting substrate 2 may be, for example, a transparent substrate such as a glass substrate or a plastic substrate.

The gate line 10, the source line 20, the gate electrode 31, the source electrode 34, and the drain electrode 35 may be formed from, for example, a metal material such as aluminum, copper, titanium, molybdenum, chromium, or an alloy thereof.

The gate insulating film 32 may be formed from, for example, an inorganic material such as silicon oxide or silicon nitride.

The semiconductor layer 33 may be formed from, for example, amorphous silicon, polycrystalline silicon, or an oxide semiconductor. In particular, the oxide semiconductor is preferred for low power consumption and high-speed driving. The oxide semiconductor can achieve low power consumption owing to the low off-leakage current (leakage current of the thin-film transistor element 30 in the off state), and also can achieve high-speed driving owing to the high on current (current of the thin-film transistor element 30 in the on state). Examples of the oxide semiconductor include a compound composed of indium, gallium, zinc, and oxygen, and a compound composed of indium, tin, zinc, and oxygen.

The first insulating film 40 and the second insulating film 60 are formed from, for example, an inorganic material such as silicon oxide or silicon nitride.

The third insulating film 80 is formed from, for example, an organic material such as an acrylic photosensitive resin.

The pixel electrode 50 and the common electrode 70 are formed from, for example, a transparent conductive material such as indium tin oxide (ITO) or indium zinc oxide (IZO).

<Detection of Short-Circuited Pixel>

Short-circuited pixel(s) among pixels is detected. A short-circuited pixel herein means a pixel whose thin-film transistor element cannot appropriately control supply of a video signal (application of voltage) to the pixel electrode due to a defect such as a short circuit between the source electrode and the drain electrode, a short circuit between the gate electrode and the drain electrode, a defect in the semiconductor layer, a short circuit between the source line and the drain electrode, or a short circuit between the gate line and the drain electrode. In Embodiment 1, an example is described in which the first pixel P1 is a normal pixel and the second pixel P2 is a short-circuited pixel.

A short-circuited pixel is detectable using a commercially available inspection device such as an array tester.

<First Repair Process>

Figure 3:
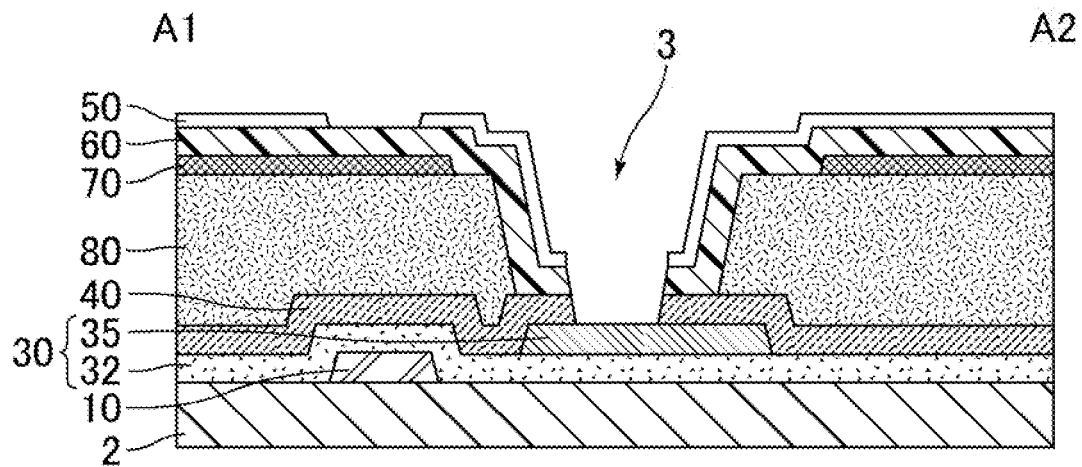
FIG. 3 is a schematic cross-sectional view showing a state after a first repair process for the structure shown in FIG. 2.

FIG. 3 is a schematic cross-sectional view showing a state after a first repair process for the structure shown in FIG. 2. As shown in FIG. 3, the first repair process removes the pixel electrode 50 inside the contact hole 3 in the second pixel P2, which is a short-circuited pixel, and thereby isolates the pixel electrode 50 from the drain electrode 35. This can stop supply of video signals to the pixel electrode 50 through the drain electrode 35.

The first repair process may remove the pixel electrode 50 by laser beam irradiation such as laser trimming. In this case, the laser beam for irradiation preferably has a wavelength equal to or shorter than ultraviolet light (e.g., 400 nm or shorter). With a laser beam having such a wavelength, the pixel electrode 50 can be removed while damage on the lower layer (e.g., drain electrode 35) is reduced. Basically, irradiation with a laser beam having a long wavelength (e.g., 532 nm, 1064 nm) vibrates the constituent molecules of the irradiation target, which generates heat. The heat energy is used to remove the irradiation target. Irradiation with a laser beam having a short wavelength (e.g., 266 nm, 355 nm) cuts the bond between the constituent molecules of the irradiation target, thereby removing the irradiation target. Thus, a laser beam having a short wavelength such as one having a wavelength equal to or shorter than ultraviolet light is less likely to generate heat in removal of the pixel electrode 50, leading to favorable results of the first repair process.

<Second Repair Process>

The second repair process forms a through hole 4 that penetrates the second insulating film 60 outside the contact hole 3 in the second pixel P2, which is a short-circuited pixel, and connects the pixel electrode 50 and the common electrode 70 to each other through the through hole 4. This stabilizes the electric potential of the pixel electrode 50 (equalizes the electric potentials of the pixel electrode 50 and the common electrode 70). The second repair process in combination with the first repair process therefore turns the second pixel P2 into a black-spot pixel without fail.

Figure 4:
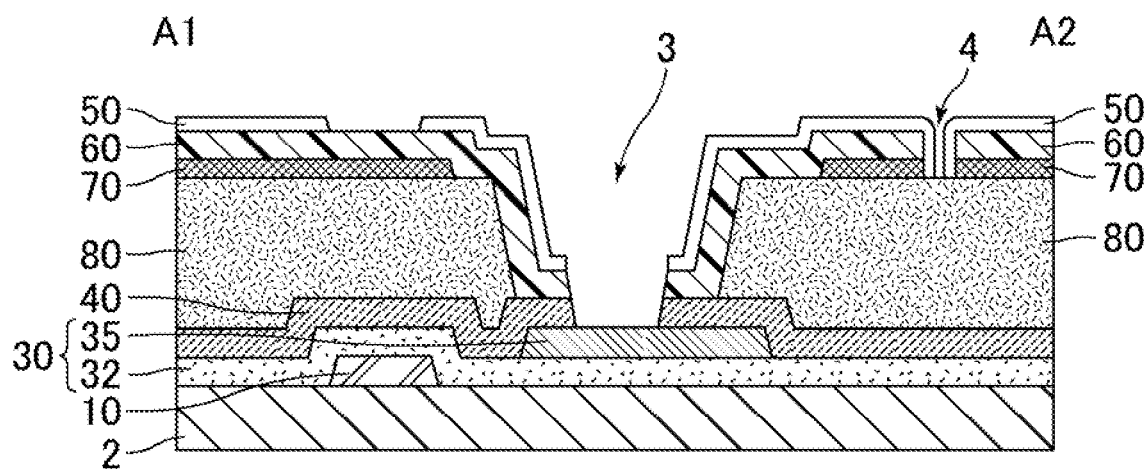
FIG. 4 is a schematic cross-sectional view showing a state after a second repair process for the structure shown in FIG. 3.

FIG. 4 is a schematic cross-sectional view showing a state after the second repair process for the structure shown in FIG. 3. As shown in FIG. 4, the second repair process may melt-connect the pixel electrode 50 and the common electrode 70 while forming the through hole 4 by laser beam irradiation. In this case, laser beam irradiation forms the through hole 4 that penetrates the pixel electrode 50, the second insulating film 60, and the common electrode 70, and covers the walls of the through hole 4 with the melted pixel electrode 50 and/or common electrode 70 (in FIG. 4, pixel electrode 50), so that the pixel electrode 50 and the common electrode 70 are connected to each other.

Figure 5:
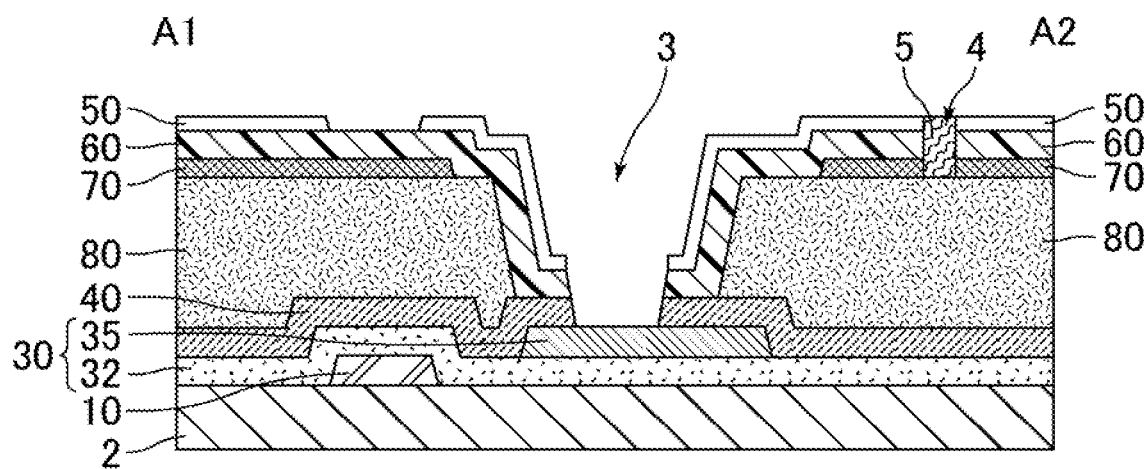
FIG. 5 is a schematic cross-sectional view showing a state after the second repair process for the structure shown in FIG. 3, which is different from the state in FIG. 4.

FIG. 5 is a schematic cross-sectional view showing a state after the second repair process for the structure shown in FIG. 3, which is different from the state in FIG. 4. As shown in FIG. 5, the second repair process may form the through hole 4 by laser beam irradiation, deposit a metal material inside the through hole 4 to form a metal layer 5, and connect the pixel electrode 50 and the common electrode 70 to each other through the metal layer 5.

The metal layer 5 may be formed from a metal such as tungsten, molybdenum, aluminum, silver, copper, or an alloy thereof. In the case of using such a metal material, whether or not the material is compatible with the materials of the pixel electrode 50 and the common electrode 70 should be considered for prevention of corrosion.

In formation of the through hole 4 as shown in FIGS. 4 and 5, since the pixel electrode 50, the second insulating film 60, and the common electrode 70 rather often have a small thickness and low pressure resistance, the intensity of the laser beam for irradiation is preferably low. Specifically, the laser beam for irradiation preferably has a wavelength of 200 to 1100 nm.

In Embodiment 1, the case was described where the first repair process is followed by the second repair process. Yet, the second repair process may be followed by the first repair process, or the first repair process and the second repair process may be performed simultaneously.

As described above, the second pixel P2, which is a short-circuited pixel, is turned into a black-spot pixel through the first repair process and the second repair process. These processes, unlike the conventional processes, eliminate the need for routing a common line for repair into the pixel. Hence, a pixel can be repaired without a decrease in the aperture ratio of the pixel even when high definition is required in an active matrix substrate for FFS mode liquid crystal display devices (i.e., complicated structure) as in Embodiment 1. Also, the repair can utilize a device (e.g., laser device) usually used in production of a liquid crystal display device, and also reduce the tact time as compared with the conventional repair, thereby contributing to an increase in the production efficiency (e.g., cost reduction).

The first repair process and the second repair process turn the second pixel P2, which is a short-circuited pixel, into a black-spot pixel, but do not affect the first pixel P1, which is a normal pixel. Thus, an active matrix substrate 1 is formed in which pixels including the first pixel P1 whose cross-sectional structure is as shown in FIG. 2 and the second pixel P2 whose cross-sectional structure is as shown in FIG. 4 or FIG. 5 are arranged in a matrix pattern.

The active matrix substrate 1 includes the thin-film transistor element 30, the first insulating film 40, the pixel electrode 50, the second insulating film 60, the common electrode 70, and the third insulating film 80 in each of the first pixel P1 and the second pixel P2. The active matrix substrate 1, including the thin-film transistor elements 30, is also referred to as a thin-film transistor array substrate.

As shown in FIG. 2, in the first pixel P1, the pixel electrode 50 and the drain electrode 35 are connected to each other through the contact hole 3 formed in the first insulating film 40 and the second insulating film 60, and the pixel electrode 50 and the common electrode 70 are superposed on each other outside the contact hole 3, with the second insulating film 60 in between.

As shown in FIG. 4 or FIG. 5, in the second pixel P2, the pixel electrode 50 and the drain electrode 35 are separated from each other inside the contact hole 3 formed in the first insulating film 40 and the second insulating film 60, and the pixel electrode 50 and the common electrode 70 are connected to each other outside the contact hole 3 through the through hole 4 formed in the second insulating film 60.

Embodiment 2

Embodiment 2 is the same as Embodiment 1 except that an active matrix substrate having a different stacking structure is produced. Thus, the points described in Embodiment 1 are not repeated below.

<Formation of Parts of Active Matrix Substrate>

Figure 6:
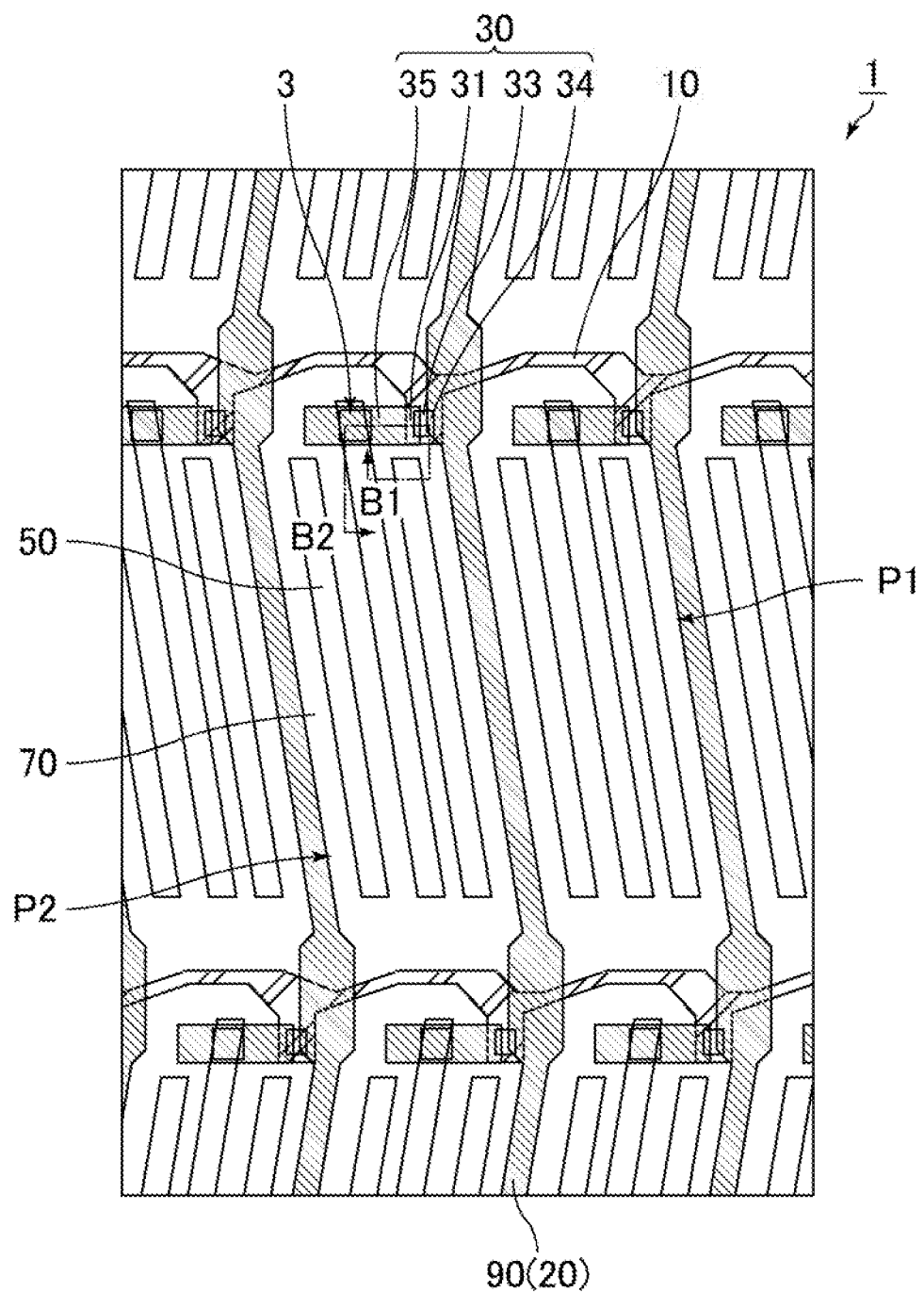
FIG. 6 is a schematic plan view showing a state after formation of parts in production of an active matrix substrate of Embodiment 2.
Figure 7:
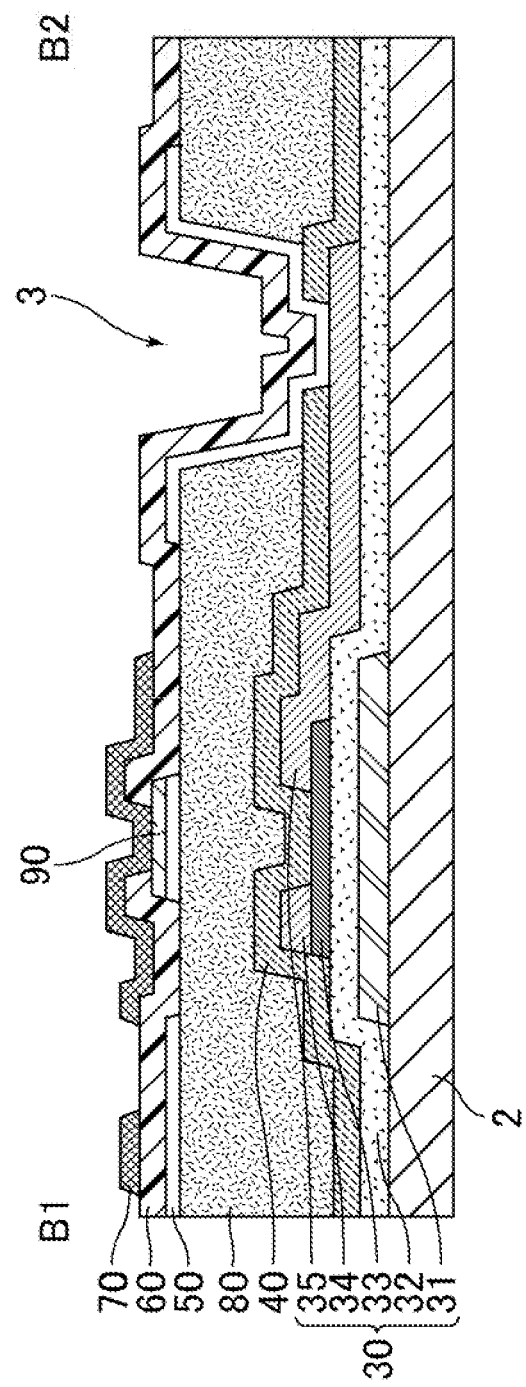
FIG. 7 is a schematic cross-sectional view of a portion taken along the line B1-B2 in FIG. 6.

FIG. 6 is a schematic plan view showing a state after formation of parts in production of the active matrix substrate of Embodiment 2. FIG. 7 is a schematic cross-sectional view of a portion taken along the line B1-B2 in FIG. 6. As shown in FIGS. 6 and 7, stacks of the gate lines 10, the source lines 20, the thin-film transistor elements 30, the first insulating film(s) 40, the pixel electrodes 50, the second insulating film(s) 60, the common electrode(s) 70, the third insulating film(s) 80, and pixel electrode lines 90 are formed on the supporting substrate 2. These parts can be formed by known methods. Here, the source lines 20 are formed below the pixel electrode lines 90 and hidden by the pixel electrode lines 90 in FIG. 6.

A thin-film transistor element 30, a first insulating film 40, a pixel electrode 50, a second insulating film 60, a common electrode 70, a third insulating film 80, and a pixel electrode line 90 are formed in individual pixels. FIG. 6 is a view with a focus on the first pixel P1 and the second pixel P2 among the pixels. Although FIG. 7 shows a cross section with a focus on the second pixel P2, a similar cross-sectional structure is formed in the first pixel P1.

The contact hole 3 is formed in the first insulating film 40 and the third insulating film 80. The pixel electrode 50 is connected to the drain electrode 35 through the contact hole 3. The second insulating film 60 covers the pixel electrode 50 and the third insulating film 80. The common electrode 70 is formed on the surface remote from the pixel electrode 50 of the second insulating film 60. The pixel electrode 50 and the common electrode 70 are superposed on each other outside the contact hole 3, with the second insulating film 60 (partially, pixel electrode line 90) in between.

The pixel electrode line 90 is formed from, for example, a metal material such as aluminum, copper, titanium, molybdenum, chromium, or an alloy thereof.

<Detection of Short-Circuited Pixel>

Short-circuited pixel(s) among pixels is detected. In Embodiment 2, an example is described in which the first pixel P1 is a normal pixel and the second pixel P2 is a short-circuited pixel.

<First Repair Process>

Figure 8:
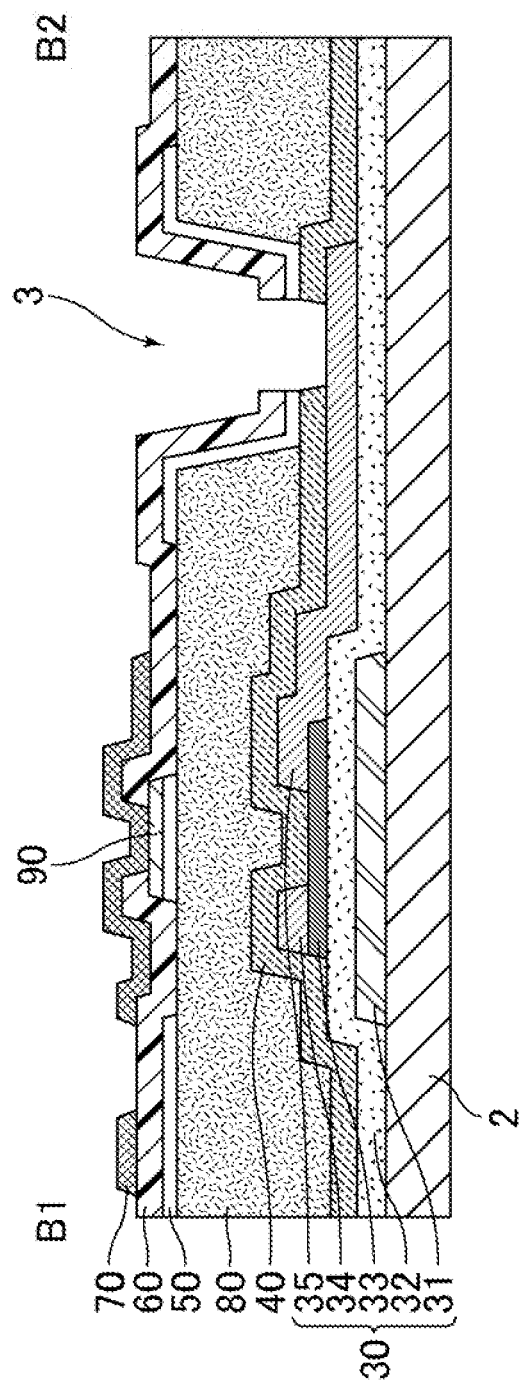
FIG. 8 is a schematic cross-sectional view showing the state after the first repair process for the structure shown in FIG. 7.

FIG. 8 is a schematic cross-sectional view showing the state after the first repair process for the structure shown in FIG. 7. As shown in FIG. 8, the first repair process removes the pixel electrode 50 and the second insulating film 60 inside the contact hole 3 in the second pixel P2, which is a short-circuited pixel, and thereby isolates the pixel electrode 50 from the drain electrode 35. This can stop supply of video signals to the pixel electrode 50 through the drain electrode 35.

The first repair process may remove the pixel electrode 50 and the second insulating film 60 by laser beam irradiation such as laser trimming.

The first repair process removes the second insulating film 60 as well as the pixel electrode 50 inside the contact hole 3. The second insulating film 60, however, may be removed in advance inside the contact hole 3 in the formation thereof. For efficient removal of the pixel electrode 50, the common electrode 70 is preferably not formed inside the contact hole 3.

<Second Repair Process>

The second repair process forms the through hole 4 that penetrates the second insulating film 60 outside the contact hole 3 in the second pixel P2, which is a short-circuited pixel, and connects the pixel electrode 50 and the common electrode 70 to each other through the through hole 4. This stabilizes the electric potential of the pixel electrode 50 (equalizes the electric potentials of the pixel electrode 50 and the common electrode 70). The second repair process in combination with the first repair process therefore turns the second pixel P2 into a black-spot pixel without fail.

Figure 9:
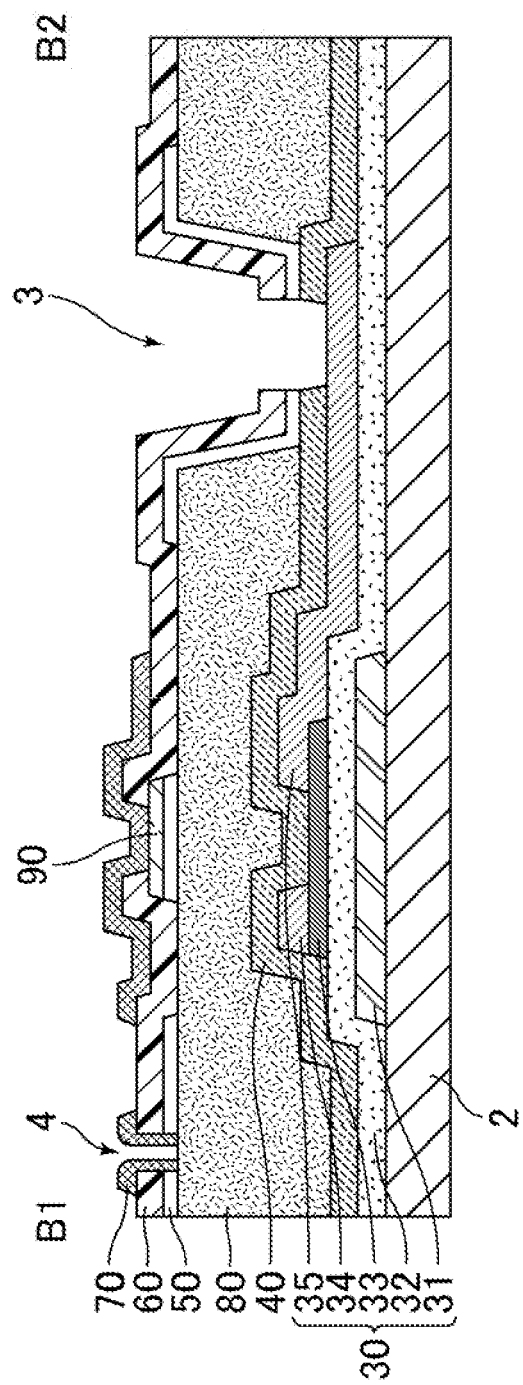
FIG. 9 is a schematic cross-sectional view showing a state after the second repair process for the structure shown in FIG. 8.

FIG. 9 is a schematic cross-sectional view showing a state after the second repair process for the structure shown in FIG. 8. As shown in FIG. 9, the second repair process may melt-connect the pixel electrode 50 and the common electrode 70 while forming the through hole 4 by laser beam irradiation.

Figure 10:
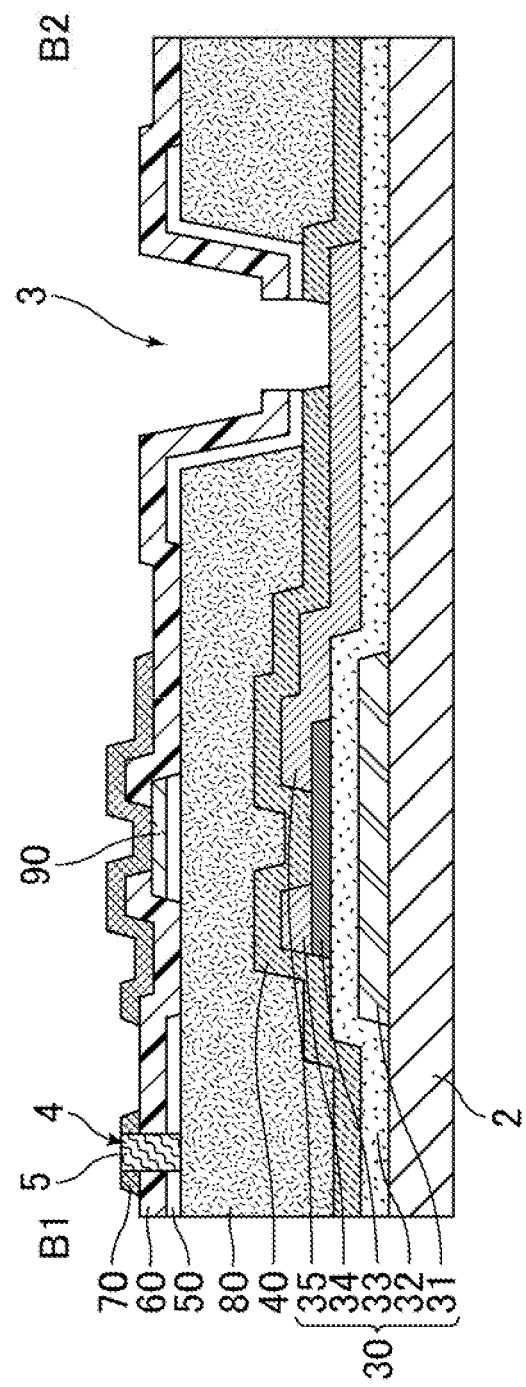
FIG. 10 is a schematic cross-sectional view showing a state after the second repair process for the structure shown in FIG. 8, which is different from the state in FIG. 9.

FIG. 10 is a schematic cross-sectional view showing a state after the second repair process for the structure shown in FIG. 8, which is different from the state in FIG. 9. As shown in FIG. 10, the second repair process may form the through hole 4 by laser beam irradiation, deposit a metal material inside the through hole 4 to form the metal layer 5, and connect the pixel electrode 50 and the common electrode 70 to each other through the metal layer 5.

The first repair process and the second repair process turn the second pixel P2, which is a short-circuited pixel, into a black-spot pixel, but do not affect the first pixel P1, which is a normal pixel. Thus, the active matrix substrate 1 is formed in which pixels including the first pixel P1 whose cross-sectional structure is as shown in FIG. 7 and the second pixel P2 whose cross-sectional structure is as shown in FIG. 9 or FIG. 10 are arranged in a matrix pattern.

The active matrix substrate 1 includes the thin-film transistor element 30, the first insulating film 40, the pixel electrode 50, the second insulating film 60, the common electrode 70, the third insulating film 80, and the pixel electrode line 90 in each of the first pixel P1 and the second pixel P2.

As shown in FIG. 7, in the first pixel P1, the pixel electrode 50 and the drain electrode 35 are connected to each other through the contact hole 3 formed in the first insulating film 40 and the third insulating film 80, and the pixel electrode 50 and the common electrode 70 are superposed on each other outside the contact hole 3, with the second insulating film 60 (partially the pixel electrode line 90) in between.

As shown in FIG. 9 or FIG. 10, in the second pixel P2, the pixel electrode 50 and the drain electrode 35 are separated from each other inside the contact hole 3 formed in the first insulating film 40 and the third insulating film 80, and the pixel electrode 50 and the common electrode 70 are connected to each other outside the contact hole 3 through the through hole 4 formed in the second insulating film 60.

What is claimed is:

1. A method for producing an active matrix substrate, comprising the steps of:
   (A) forming in individual pixels a thin-film transistor element, a first insulating film, a pixel electrode to be connected to a drain electrode of the thin-film transistor element through a contact hole formed at least in the first insulating film, a second insulating film, and a common electrode to be superposed on the pixel electrode outside the contact hole, with the second insulating film in between;
   (B) detecting a short-circuited pixel among the pixels;
   (C) removing the pixel electrode inside the contact hole in the short-circuited pixel and thereby isolating the pixel electrode from the drain electrode; and
   (D) forming a through hole that penetrates the second insulating film outside the contact hole in the short-circuited pixel, and connecting the pixel electrode and the common electrode to each other through the through hole, and
   wherein the step (D) includes melt-connecting the pixel electrode and the common electrode while forming the through hole by laser beam irradiation.

2. The method for producing an active matrix substrate according to claim 1, wherein the step (C) includes removing the pixel electrode by laser beam irradiation.

3. The method for producing an active matrix substrate according to claim 2,
   wherein the laser beam for irradiation in the step (C) has a wavelength equal to or shorter than ultraviolet light.

4. The method for producing an active matrix substrate according to claim 1,
   wherein the active matrix substrate is an active matrix substrate for fringe field switching (FFS) mode liquid crystal display devices.

* * * * *